US011667477B2

(12) United States Patent
Marti Sala et al.

(10) Patent No.: US 11,667,477 B2
(45) Date of Patent: Jun. 6, 2023

(54) MACHINE FOR AUTOMATICALLY POSITIONING OBJECTS

(71) Applicant: POSIMAT, SA, Barbera del Valles (ES)

(72) Inventors: Jaime Marti Sala, Sant Cugat del Valles (ES); Alex Marti Mercade, Sant Cugat del Valles (ES); Elisabet Marti Mercade, Sant Cugat del Valles (ES)

( * ) Notice: Subject to any disclaimer, the term of this patent is extended or adjusted under 35 U.S.C. 154(b) by 0 days.

(21) Appl. No.: 17/638,888

(22) PCT Filed: Sep. 29, 2020

(86) PCT No.: PCT/EP2020/077226
§ 371 (c)(1),
(2) Date: Feb. 28, 2022

(87) PCT Pub. No.: WO2021/104719
PCT Pub. Date: Jun. 3, 2021

(65) Prior Publication Data
US 2022/0306400 A1 Sep. 29, 2022

(30) Foreign Application Priority Data
Nov. 28, 2019 (ES) .............................. ES201931961U

(51) Int. Cl.
*B65G 47/248* (2006.01)
*B65G 47/84* (2006.01)
(52) U.S. Cl.
CPC ......... *B65G 47/248* (2013.01); *B65G 47/843* (2013.01); *B65G 47/848* (2013.01); *B65G 2201/0244* (2013.01)
(58) Field of Classification Search
CPC .. B65G 47/848; B65G 47/914; B65G 47/843; B65G 47/248; B65G 2201/0244; B65G 47/2445
(Continued)

(56) References Cited

U.S. PATENT DOCUMENTS

| 2,643,778 A | * | 6/1953 | Socke | B65G 47/24 198/377.04 |
| 3,426,884 A | * | 2/1969 | Donner | B65G 15/14 198/408 |

(Continued)

FOREIGN PATENT DOCUMENTS

| DE | 4134735 A1 * | 4/1993 | ............. B65G 47/82 |
| EP | 2720036 A2 * | 9/2013 | ............. G01N 27/92 |

(Continued)

*Primary Examiner* — James R Bidwell
(74) *Attorney, Agent, or Firm* — Eugenio J. Torres-Oyola; Victor M. Rodriguez-Reyes; Rafael Rodriguez-Muriel

(57) ABSTRACT

A machine for automatically positioning objects is disclosed. The machine has one inlet conveyor to transport objects in a lying position; a detector system to identify the orientation and/or shape of the objects; a robotic collection device to collect and position the objects according to information received by the detector system; a transfer conveyor having transfer fasteners arranged in fixed positions along a periphery of the transfer conveyor defining a closed loop around a tilted axis; an outlet conveyor to receive and transport the objects in an upright position; and a transfer fastener seat for the objects at each transfer fastener. The conveyor moves the fasteners seats because of the movement of the transfer conveyor between an upper receiving position, in which the object is held in a lying position, and a lower delivery position, in which the object is held in an upright position. The transfer conveyor and the outlet conveyor are synchronized.

19 Claims, 11 Drawing Sheets

(58) Field of Classification Search
USPC .................................... 198/400, 412, 414
See application file for complete search history.

(56) References Cited

U.S. PATENT DOCUMENTS

| | | | |
|---|---|---|---|
| 3,518,938 A * | 7/1970 | Ellis .................... | B41F 15/0872 |
| | | | 101/40 |
| 5,725,082 A * | 3/1998 | Connell ............... | B65G 47/848 |
| | | | 198/471.1 |
| 7,156,219 B2 * | 1/2007 | Voigtmann .......... | B65G 47/843 |
| | | | 198/377.04 |
| 2004/0011623 A1 † | 1/2004 | Sala | |
| 2013/0036887 A1 * | 2/2013 | Moore .................... | B26D 7/32 |
| | | | 198/470.1 |
| 2021/0009360 A1 † | 1/2021 | Mulet Valles | |

FOREIGN PATENT DOCUMENTS

| | | | | |
|---|---|---|---|---|
| ES | 2310379 T3 † | 8/2006 | | |
| ES | 2705352 A1 † | 3/2019 | | |
| WO | 2019/179685 A1 * | 9/2019 | ............ | B65G 47/24 |
| WO | 2022034249 A1 † | 2/2022 | | |

\* cited by examiner
† cited by third party

MACHINE FOR AUTOMATICALLY POSITIONING OBJECTS

TECHNICAL FIELD

The present utility model relates to a machine for positioning objects by means of a robotic collection device. The robotic collection device performs a previous detection of the objects located in different positions and orientations preferably in a lying position and positioning the objects in an upright position, being a first step of subsequently steps as labelling or filling bottles, etc.

The present utility model is especially suited to handle bottles of any size, shape and with external superficial decoration, in particular plastic bottles as well as for positioning bottle caps.

BACKGROUND

WO2013189656A1 relates to a feeding device for feeding products and/or stacks of products to a packaging process of a packaging machine, in particular of a horizontal tube packaging machine, comprising a guide unit which is disposed as a closed loop and on which a plurality of conveyor elements are arranged so as to be drivable mutually independently in a speed- and/or position-controlled manner at least along at least one working section of the guide unit. At least one conveyor element has a holder, and at least one conveyor element that follows contrary to a conveying direction has a counter holder.

EP2746165A1 discloses a device for gripping and transferring individual products. The device comprises a belt on which the individual products are randomly arranged, a conveyor carrying a plurality of supports for groups of products, and a plurality of manipulators programmed to pick up the individual products from the belt and to deposit the products on said supports so as to form ordered groups of products on said supports, wherein said conveyor is formed by a linear motor including: a loop stator having two parallel straight branches joined together by two curved branches, and a plurality of movers movable independently from each other along the stator and carrying said supports.

WO2019179685A1 discloses a machine for positioning objects, comprising a first conveyor belt configured to receive a plurality of objects; a machine vision device configured to identify the position and the shape of the objects arranged on the first conveyor belt; robotic collection means configured to collect the objects from the first conveyor belt according to the information received from the machine vision means; and a second conveyor belt configured to enable the outlet of said objects. The machine comprises a transfer conveyor that has a plurality of transfer carriers configured to move in a closed loop through the transfer conveyor enabling the speed and position thereof to be controlled independently, where said transfer carriers are configured to receive the objects coming from the robotic collection means and deliver said objects to the second conveyor belt. One of the drawbacks of this machine is that it requires a special transfer conveyor, which is a complex device that needs special maintenance and has an important cost.

DISCLOSURE OF THE INVENTION

The present invention contributes to overcome the above cited problems and other drawbacks by providing a machine for automatically positioning objects using a robotic collection means for collecting and positioning objects such as bottles, among other kinds of objects such as containers or jars. The bottles can have different shapes or design.

The present invention is directed towards a machine for automatically positioning objects comprising, in a way known in the available state of the art:

- at least one inlet conveyor configured to transport a plurality of objects in a lying position;
- a plurality of transfer fasteners, movable along a closed loop in a plane tilted with respect to the horizontal, between an upper receiving region, where the transfer fasteners are movable in a first direction and configured to receive the objects held in a lying position, and a lower delivery region, where the transfer fasteners are movable in a second direction opposed to the first direction and configured to deliver the objects held in an upright position, transferring the objects from the lying position to the upright position due to the movement of the transfer fasteners along the close loop;
- at least one outlet conveyor adjacent to the lower delivery region of the transfer conveyor and synchronized thereto for receiving the objects in the upright position;
- a detector system configured to identify at least an orientation and/or a shape of the objects transported on the inlet conveyor;
- at least one robotic collection device configured to collect the objects in the lying position from the inlet conveyor, to rotate along a vertical axis according to the information received from the detector system and to transfer the object to the upper receiving region of the transfer fasteners moving the object in the first direction in coordination with the movement of the transfer fasteners.

In one particular embodiment, the machine comprises one inlet conveyor for transporting the bottles from a loading hopper, the bottles being placed in a lying position.

The inlet conveyor can include elements or devices which cooperate, actively or passively to place the objects in a regular or uniform position or lying position before reaching an area of operation of a robotic collection device.

The inlet conveyor is connected to a detector system, i.e. the detector system is able to detect some parameter or characteristics of the objects located in a determined place or station along the inlet conveyor. These parameters or characteristics of the object can be for example the shape or the orientation. The detector system in one embodiment is a smart vision system that is configured to identify at least an orientation and a shape of the objects arranged on the inlet conveyor. The detector system can be more complex and with higher capabilities while this aspect not forming part of the inventive concept of this invention.

In one embodiment, once the bottles have been identified by the smart vision system, they are collected by one or more robotic collection devices such as an articulated arm robot with four axes or an electronic handle gantry or a SCARA robot. All the objects are placed in a workplace of the robotic collection devices in the inlet conveyor. The inlet conveyor is connected to the robot collection device and can operate in the line with the information received by the detector system. In this regard, the robot collection device can pick up one bottle that is located in a particular position and/or orientation and subsequently leave the bottle positioned in a particular position and/or orientation in a certain transfer fastener placed in the upper receiving region, preferably rotating said object around a vertical axis to adapt its orientation from the picking up orientation to the leaving orientation.

The leaving orientation is preferably a lying position in which a vertical object axis is horizontal and perpendicular to the movement direction of the transfer fastener.

The machine also comprises an outlet conveyor to receive and transport the bottles in an upright position to an outlet or a subsequently step as for example a labelling or filling or packaging station further handling the bottles or other step of a full process.

The machine also comprises a plurality of transfer fasteners movable in a closed loop coplanar with a plane inclined or tilted from the horizontal.

One degree of the tilt of said tilted plane of the closed loop can be 45 degrees involving an improvement of the process of positioning bottles. However, it should be noted that different degrees of tilt of the central axis from 0 to 90 are also possible for the invention to correctly work.

The present invention also includes the following features, not known from the available prior art:
- the transfer fasteners are attached in fixed positions along a periphery of a transfer conveyor movable along the closed loop, the transfer fasteners being dragged by the transfer conveyor;
- each transfer fastener includes a suction nozzle, connected to a suction source, each suction nozzle defining a seat surface tilted with respect to the tilted plane of the closed loop and which is approximately horizontal when in the upper receiving region and which is approximately vertical when in the lower delivery region; and wherein
- the seat surfaces of all the transfer fasteners are non-recessed surfaces, exposed, configured to retain the objects by suction, without confinement of the objects in the transfer fasteners.

The transfer conveyor can be a flexible band defining, for example, an elongated closed loop, or a disc shaped member defining a circular closed loop, said transfer conveyor being actuated to produce its movement along the closed loop.

The transfer fasteners are attached to said transfer conveyor in fixed positions, producing the simultaneous movement of all said transfer fasteners dragged by the movement of the transfer conveyor.

The transfer conveyor comprises transfer fasteners that are arranged in a fixed position of the transfer conveyor and the transfer fasteners move solidary with the transfer conveyor and the transfer fastener are moving with the rotary movement of the transfer conveyor, that means the transfer fasteners move as a result of the movement of the transfer conveyor. The transfer fasteners move from an upper position to a lower position.

Each transfer fastener includes a suction nozzle connected to a suction source, such a pneumatic vacuum source, a suction fan or similar, to retain by suction an object deposited on a seat surface of the suction nozzle by the robotic collection device.

Each transfer fastener can include one or multiple suction nozzles, in which case the seat surfaces of all the suction nozzles of the same transfer fastener are preferably coplanar to each other.

Preferably the seat surface, which cab optionally be a concave seat surface to receive a concave object, is elongated in a direction perpendicular to the movement direction of the transfer fasteners. An object, elongated along a vertical object axis defining an elongated central region of the object, placed in a laying position on said seat surface with the vertical object axis horizontal and perpendicular to the movement direction of the transfer fastener, can be efficiently retained by suction through said elongated central region of the object.

Said elongated seat surface or concave elongated seat surface can be defined by single elongated suction nozzle or by multiple suction nozzles, which can be also elongated.

Said seat surfaces are non-recessed surfaces, it is to say surfaces not contained within a housing or depression, at its bottom, but accessible exposed surfaces on top of which objects of any shape or size can be placed without requiring adaptation of the transfer fastener due to the lack of housing or depression adapted to contain said object.

Therefore, each seat surface is the surface of the transfer fastener farthest from the transfer conveyor where said transfer fastener is attached, the aggregation of all the seat surfaces defining an outer perimeter of the assembly defined by the transfer conveyor and transfer fasteners attached thereto.

The proposed transfer fasteners retain the objects only by suction, providing multiple benefits.

Firstly, different objects, of different size and shape, can be transferred without having to adapt the transfer fasteners, offering greater flexibility to production.

Secondly, by avoiding clamps or other grasping solutions, thin objects can be handled which, when empty, can be easily squeezed, which is a growing trend to reduce material usage and facilitate recycling.

To achieve the transfer of the objects from the lying position to the upright position, the seat surfaces of each transfer fastener is tilted with respect to the closed loop tilted plane, it is to say that said seat surfaces are not parallel to the closed loop tilted plane but are at an inclination with respect to said plane.

Typically, the closed loop plane is at 45° with respect to the horizontal, and each seat surface is at around 45° (between 40° and 50°) with respect to the closed loop plane, so that when the transfer fasteners are at the upper receiving region the seat surfaces are approximately horizontal and when the transfer fasteners are at the lower delivery region the seat surfaces are approximately vertical.

This kind of arrangement facilitates the transfer of the objects by the robotic collection device from the inlet conveyor to the seat surface of the transfer fasteners with a lower demand for the robotic collective device, and therefore with an increase in performance and velocity.

According to one embodiment of the present invention, the transfer conveyor is a flexible band perpendicular to the tilted plane of the closed loop. The flexible band has a longitudinal direction following the closed loop, a transversal direction which is the one perpendicular to the closed loop plane, and a negligible thickness.

Preferably, the flexible band is perforated and surrounds a suction chamber connected to the suction source. The suction nozzles of the transfer fasteners are connected to the suction chamber across the perforated flexible band.

In this embodiment, the upper receiving region and the lower delivery region will be defined by straight segments of the transfer conveyor, each containing multiple transfer fasteners simultaneously.

This embodiment allows the robotic collection device to be multiple robotic collection devices delivering multiple objects simultaneously on different transfer fasteners placed on the upper receiving region, or to allow each robotic collection device the optimal transfer fastener on which delivery the object to, in combination with the remaining robotic collection devices, achieve the maximal output of objects.

According to an alternative embodiment, the transfer conveyor is a disc shaped member rotative around an axis perpendicular to the tilted plane of the closed loop and wherein the disc shaped member surrounds and/or contains a suction chamber connected to the suction source, being the suction nozzles connected to said suction chamber.

Whether the transfer conveyor is a flexible band or a disc shaped member, the transfer conveyor include a static blocking screen configured to interrupt the connection between the suction nozzles of the transfer fasteners and the suction chamber coincident with the lower delivery region. Said static blocking screen is interposed between the transfer conveyor and the rest of the suction chamber, blocking the perforations of the transfer conveyor which connects the suction nozzles of the transfer fasteners located on the lower delivery region with the rest of the suction chamber, releasing the object retained therein producing ots delivery.

The rotary transfer member can be connected to a servomotor which drives the rotary transfer conveyor to stop or decelerate transfer fasteners in the upper receiving region, said stop or deceleration also determining the stop or deceleration of another transfer fasteners adjacent to the outlet conveyor. The coordination of the servomotors with the delivery speed of the at least one robotic collection device allows the optimization of the machine.

According to al alternative embodiment, the transfer conveyor can be driven by an asynchronous electric motor, moving the transfer conveyor at a regular speed, preventing undesired releases of the objects from the suction nozzles due to accelerations or decelerations. In this case the at least one robotic collection device must coordinate with the movement of the transfer fasteners.

In one embodiment the outlet conveyor further includes a plurality of pucks to receive objects lacking a base.

In one embodiment the machine has two rotary transfer members, which could be on opposed sides of the inlet conveyor, where they could be accessible for the same robotic collection device placed above the inlet conveyor, or which could be on successive positions in the same side of the inlet conveyor.

According to one embodiment, the detector system configured to differentiate between objects lying in a first lying position, for example in a face up position, and objects in a second lying position, for example in a face down position. The robotic collection device will be configured to transfer the objects lying in the first lying position to one of said two transfer conveyors and to transfer the objects lying in the second lying position to the other of said two transfer conveyors.

In that case, all the objects of each transfer conveyor will have the same orientation and will be delivered with the same orientation. If all the objects need to be feed into the same line with the same orientation, then the outlet conveyor can be configured to receive the objects from both transfer conveyors merging the objects all having the same axial orientation when reaching the outlet conveyor.

This can be accomplished by one of the following possible embodiments:

each transfer conveyor discharges the objects on different outlet conveyors which converge in a single outlet conveyor, where the bottles carried by the different outlet conveyors converge interleaved, the objects having or having not a uniform axial orientation; or each transfer conveyor discharges the objects respectively on first and second successive portions of the same outlet conveyor, the objects discharged in the second portion being interleaved between the objects discharged on the first portion of the outlet conveyor, the objects having or having not a uniform axial orientation.

Alternatively, a turner transfer conveyor can be placed between one of the transfer conveyors and the outlet conveyor for turning all the objects 180° around its vertical central axis before being delivered to the outlet conveyor.

The turner transfer conveyor is a rotative conveyor which receives objects in the upright position from the lower delivery region of one of the first and second transfer conveyors and delivers said objects in the upright position to the outlet conveyor after turning said objects around a vertical object axis.

It will be understood that references to geometric position, such as parallel, perpendicular, tangent, etc. allow deviations up to ±5° from the theoretical position defined by this nomenclature. It will also be understood that any range of values given may not be optimal in extreme values and may require adaptations of the invention to these extreme values are applicable, such adaptations being within reach of a skilled person.

Other features of the invention appear from the following detailed description of an embodiment.

BRIEF DESCRIPTION OF THE FIGURES

The foregoing and other advantages and features will be more fully understood from the following detailed description of several embodiments with reference to the accompanying drawings, to be taken in an illustrative and non-limitative manner, in which.

DETAILED DESCRIPTION OF SEVERAL EMBODIMENTS

It will be understood that various parts of one embodiment of the invention can be freely combined with parts described in other embodiments, even being said combination not explicitly described, provided there is no harm in such combination.

Figure 1:
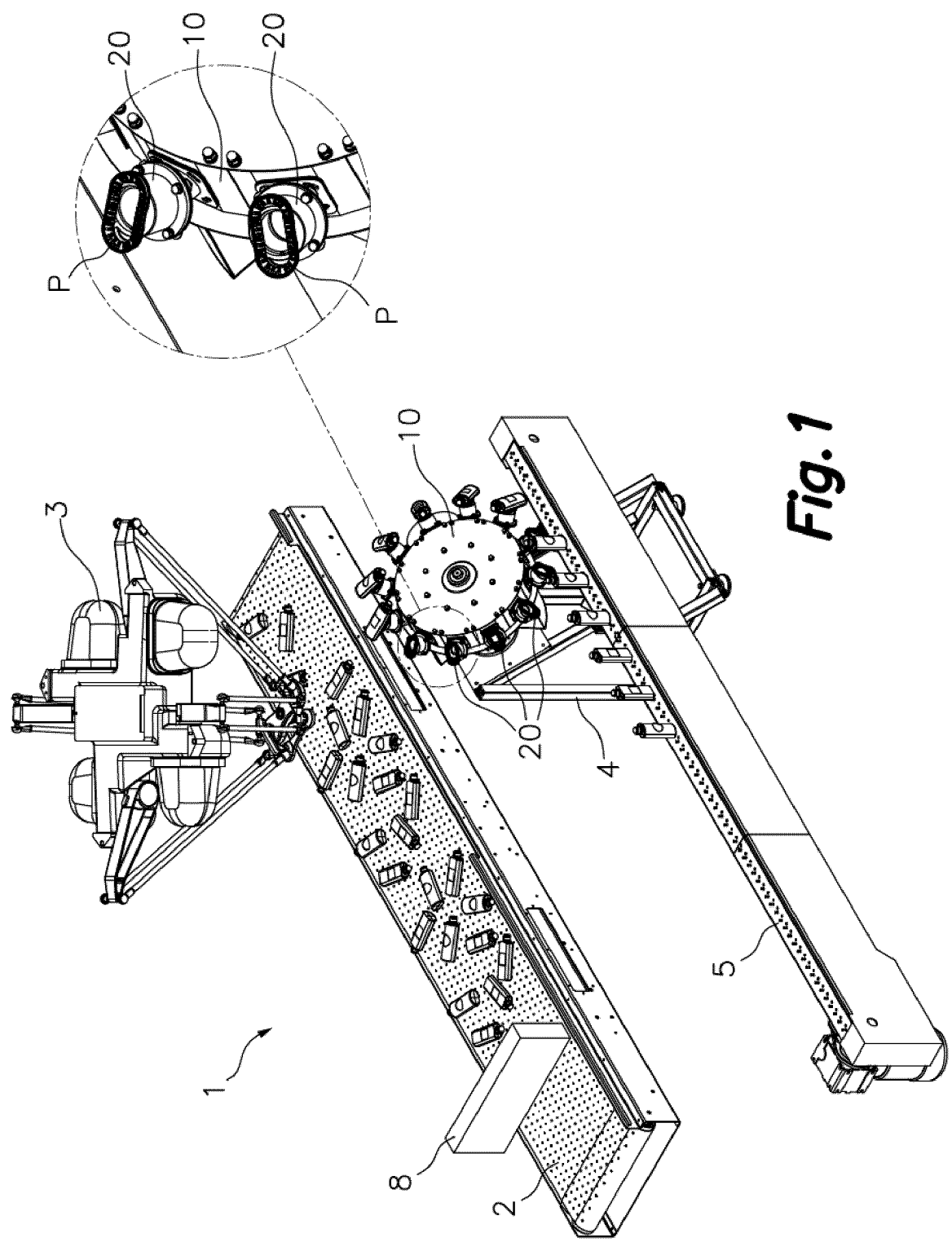
FIG. 1 is a perspective view of a machine for automatically positioning objects according to an embodiment of the present invention, wherein the transfer conveyor is a disc shaped member rotative around an axis perpendicular to the tilted plane of the closed loop, and a zoomed view of some transfer fasteners.
Figure 2:
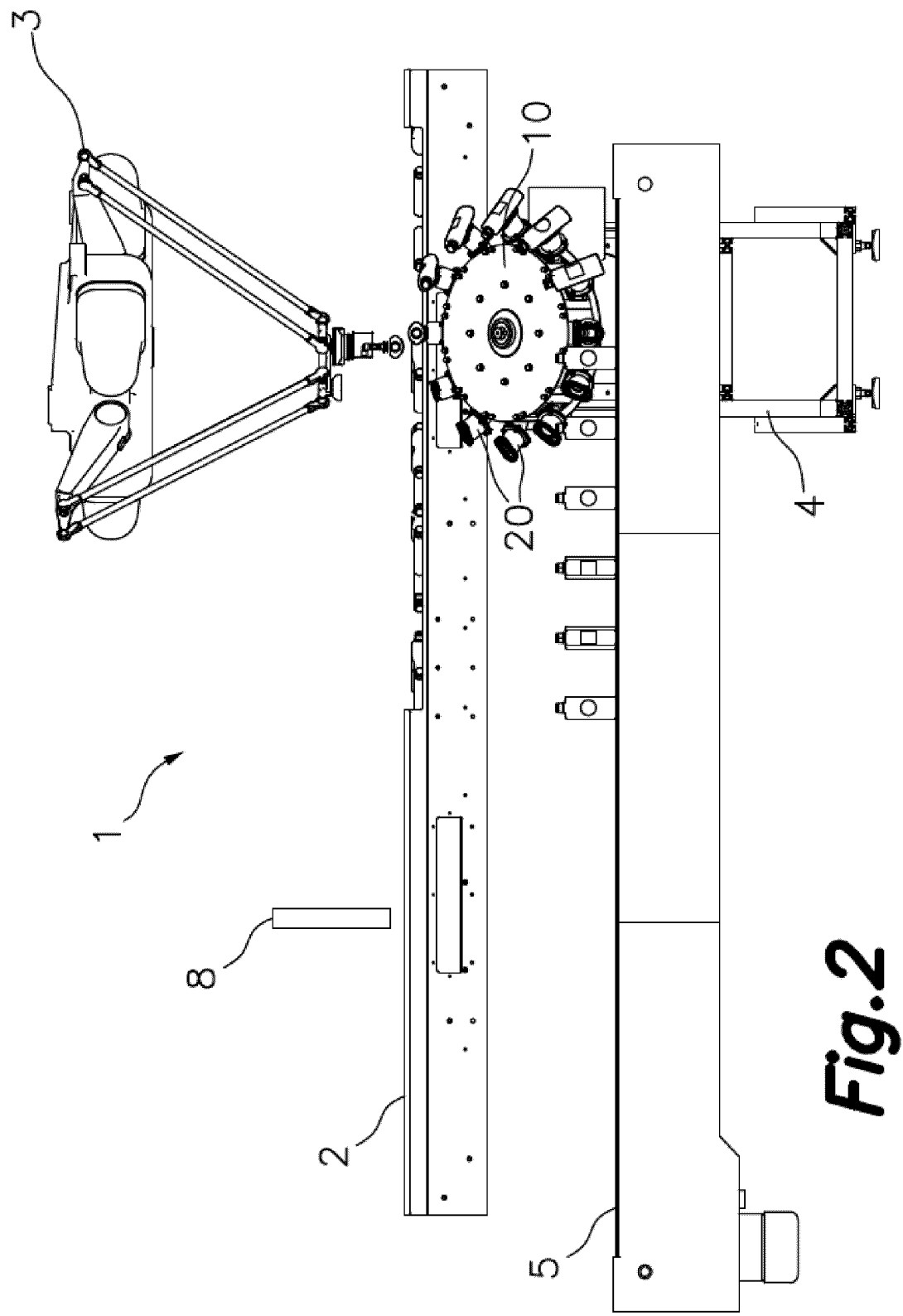
FIG. 2 is a front view of the machine for objects of FIG. 1.
Figure 3:
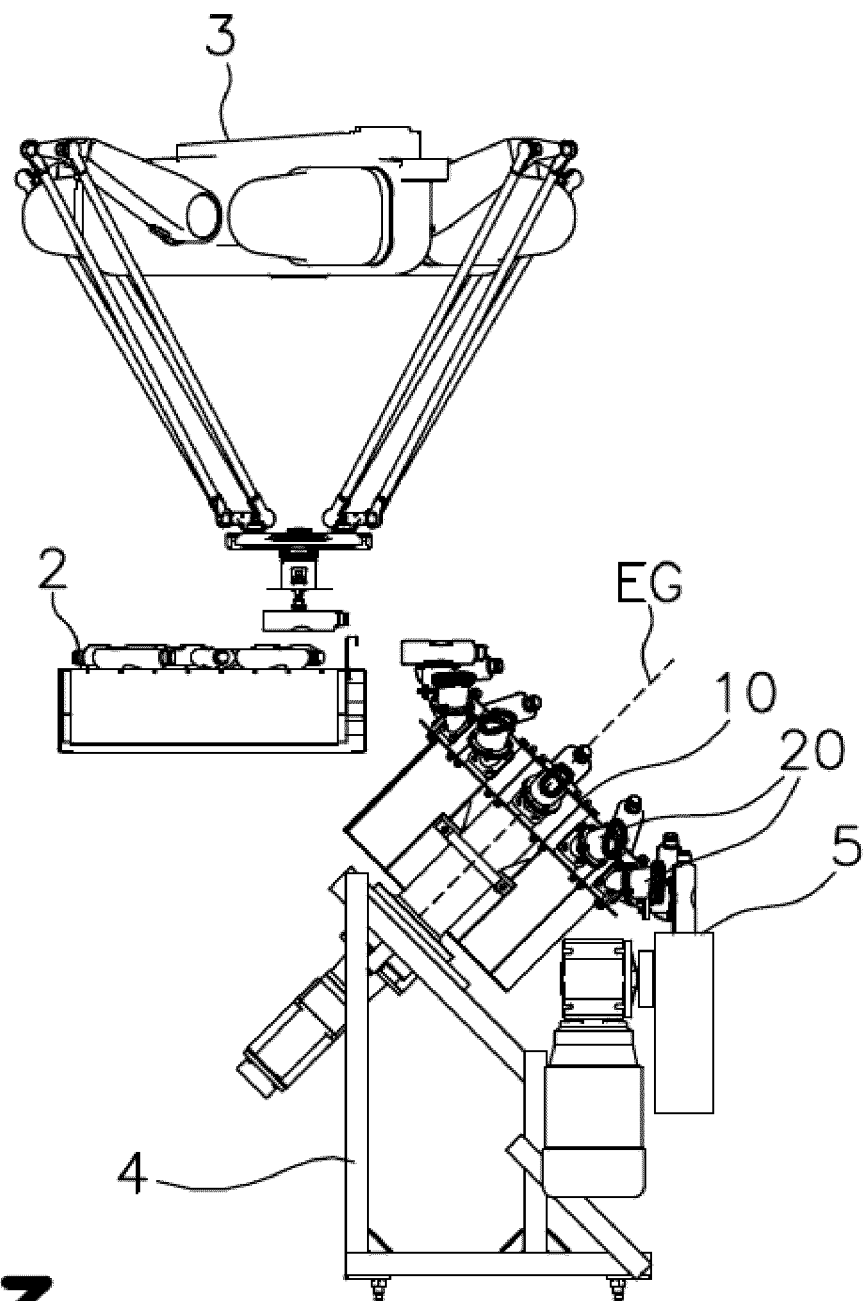
FIG. 3 is a lateral view of the machine for objects of FIG. 1.

With regard to FIGS. 1, 2 and 3, a machine 1 for automatically positioning objects is disclosed, in this case for positioning bottles. The machine 1 comprises one inlet conveyor 2, a detector system 8, a robotic collection device 3, a transfer conveyor 10 and one outlet conveyor 5.

The inlet conveyor 2 comprises a horizontal belt where the bottles lie, the inlet conveyor 2 is connected by an actuator that gives movement to the conveyor belt or moving belt at a given speed for transporting the bottles trough a way where a detector system 8 is located and forward to a pick-up area.

The detector system 8 could be a smart vision system, or an optical system enabled to detect some characteristic of all the bottles located in the inlet conveyor 2. This detector system 8 is connected to a data transmission system that sends the information received of the position, orientation, and the shape or even additionally a sign or special mark if the bottle has some.

This information is sent to one robotic collection device 3, that as FIGS. 1, 2 and 3 show is a robot with an articulated arm with four degree of freedom of movement axes. The robotic collection device 3 operates and manipulates the bottles under the instruction of an algorithm provided by a computer. The robotic collection device 3 searches and picks up a bottle. The robotic collection device 3 then rotates the bottle around a vertical axis to orient said bottle with its bottle vertical axis, which is now horizontal because the bottle is lying, perpendicular to the movement direction of the transfer fasteners of the upper receiving region, and places the bottle into the seat surface P of one transfer fastener 20 attached to the transfer conveyor 10. This is done for all the bottles one by one.

The transfer conveyor 10 in this embodiment is a disk-shaped member in the form of a rotary disk that comprises at its periphery a plurality of transfer fasteners 20 attached thereto in fixed positions, arranged in a closed loop. The transfer conveyor 10 rotates or revolves around its own axis that is a central axis EG. The transfer fasteners 20 are arranged in fixed positions of the transfer conveyor 10 and also arranged at the same distance from this central axis EG arranged in a circular disposition, and each transfer fasteners 20 are also arranged equidistantly are evenly spaced from one another. The central axis EG in this embodiment is tilted 45 degrees from the horizontal, defining the closed loop of the transfer members 20 in a tilted plane defined at 45 degrees from the horizontal.

Each transfer fasteners 20 comprises at least one suction nozzle connected to a suction source 30, said at least one suction nozzle defining a seat surface P where the object is supported and retained by suction during its transfer from the upper receiving region to the lower delivery region.

In this example, the disk-shaped member is a suction chamber 31 connected to the suction source 30 through a rotative joint, producing a partial vacuum in said suction chamber 31. The transfer fasteners 20 are attached on the periphery of said rotative disk-shaped suction chamber 31, the correspondent suction nozzles being in connection with said suction chamber 31.

The seat surfaces P of the transfer fasteners 20 are tilted regarding the tilted plane defining the closed loop and are also tilted regarding said central axis, preferably being at 45 degrees. This tilted position of the seat surfaces P allow the seat surfaces P to change from an horizontal position, when in the upper receiving region, to a vertical position, when in the lower delivery region, due to its rotation around the central axis EG.

The robotic collection device 3 puts or places each bottle in the seat surface P of each transfer fastener 20 also in a lying position and in an upper receiving region, then the transfer conveyor 10 rotates and when the transfer fastener 20 that carries the bottle is in a lower delivery region, the bottle is delivered and positioned in the outlet conveyor 5 in an upper-right position of the bottle. The speed of the transfer conveyor 10 in the lower delivery position of the transfer fastener 20 in the moment of the delivery of the bottle is synchronised with the speed of the movement of the outlet conveyor 5.

The outlet conveyor 5 comprises a horizontal conveyor belt that is covered with an adherent surface or a surface with some suction means for ensuring a suitable adhesion of the bottles to the outlet conveyor 5 and that help in that the bottles don't fall out for the movement of the conveyor belt.

FIGS. 1, 2 and 3 also show a support 4 structure for supporting the rotary transfer member 10 and the outlet conveyor 5 belt and this support 4 structure is anchored to the floor.

Figure 4:
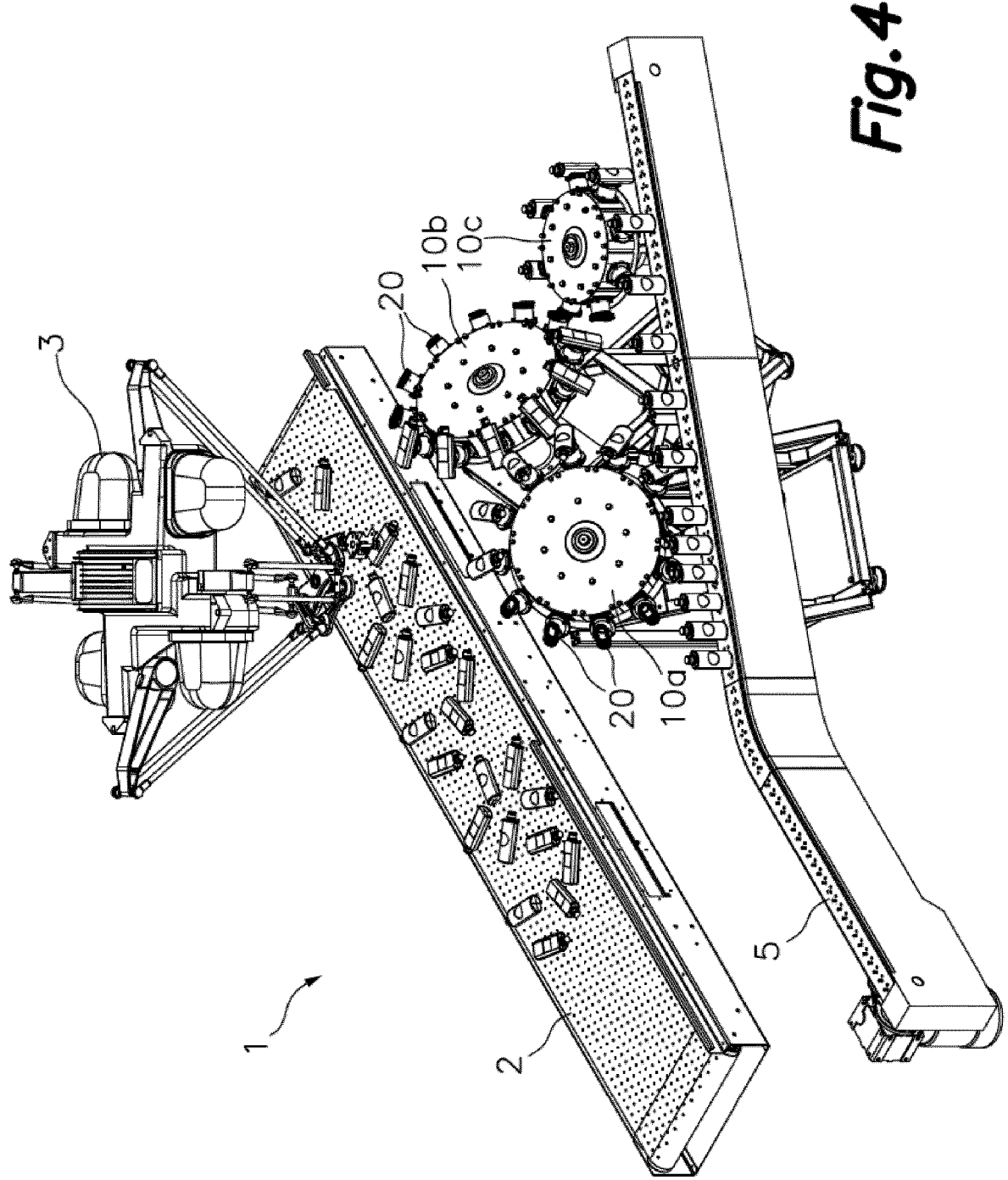
FIG. 4 is a perspective view of a machine for automatically positioning objects according to another embodiment of the present invention, including two transfer conveyors located at one same side of the inlet conveyor, and also a turner transfer conveyor associated to the second transfer conveyor to turn the objects discharged by the second transfer conveyor around a vertical axis.
Figure 5:
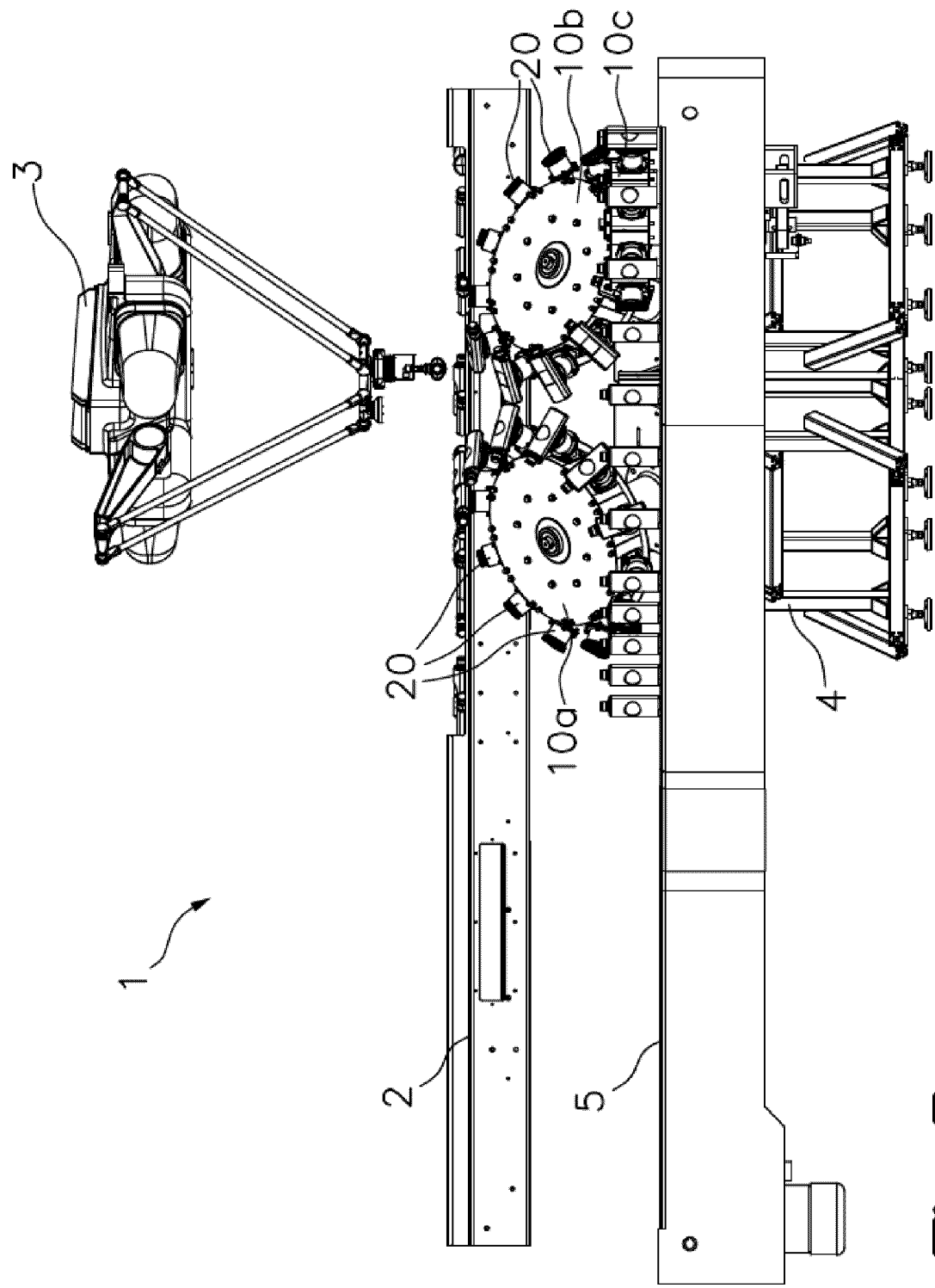
FIG. 5 is a front view of the machine for objects of FIG. 4.
Figure 6:
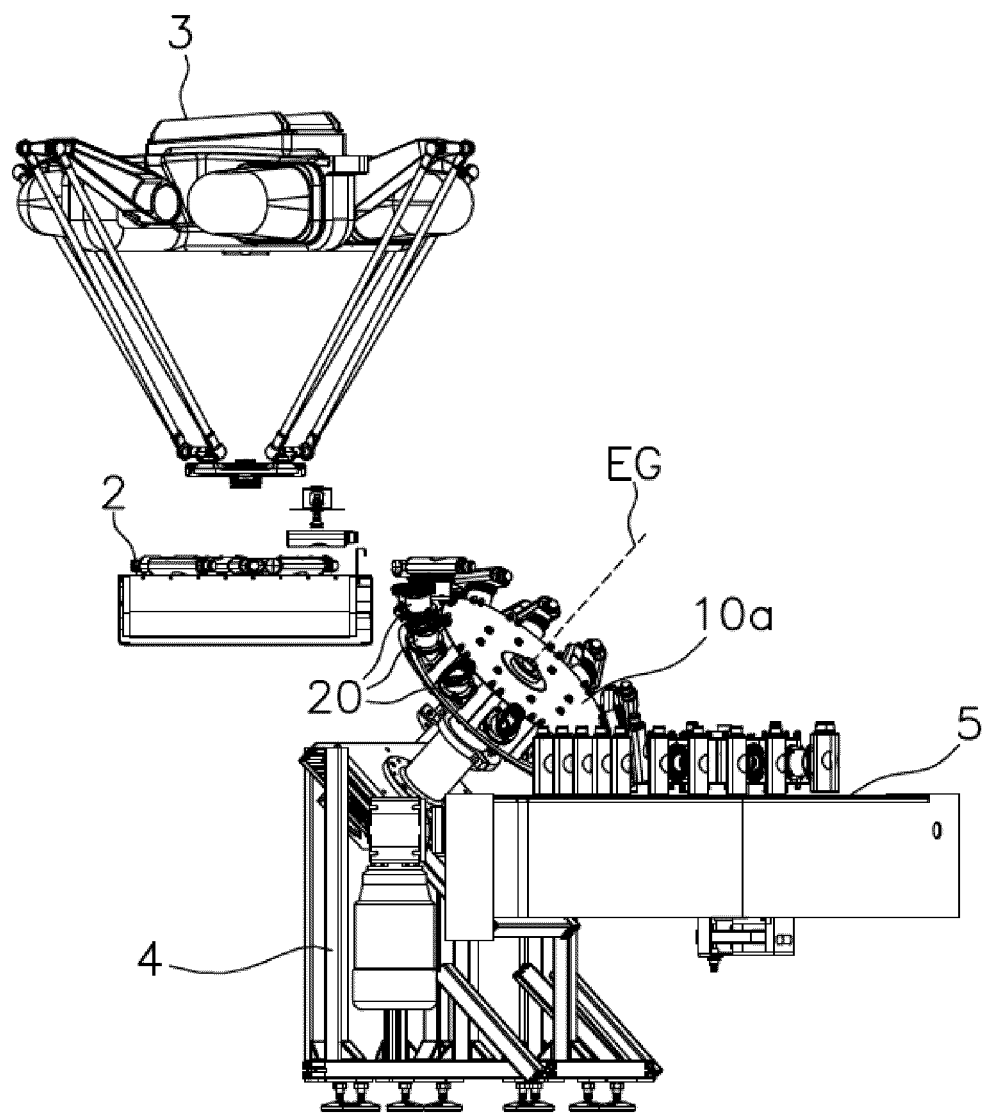
FIG. 6 is a lateral view of the machine for objects of FIG. 4.

FIGS. 4, 5 and 6 show a machine 1 for automatically positioning bottles according to this invention that comprises one inlet conveyor 2 similar of the inlet conveyor 2, and one robotic collection device 3, these elements being equals to the elements disclosed in FIGS. 1, 2 and 3.

The machine 1 shown in FIGS. 4, 5 and 6 and in this embodiment, also comprises two transfer conveyors 10a, 10b located at one same side of the inlet conveyor 2, and also show a turner transfer conveyor 10c that is associated to the second transfer conveyor 10b located upstream of the outlet conveyor 5 to turn the objects discharged by the second transfer conveyor 10b around a longitudinal axis, so that all the objects on the outlet conveyor have the same uniform axial orientation.

The robotic collection device 3 receives the information detected by the detector system 8 and the robotic collection device 3 operates and delivers the bottles under the instruction of an algorithm provided by a computer.

In this embodiment the machine 1 comprises a support or frame 4 structure for supporting the transfer conveyor 10 and the outlet conveyor 5 belt. This support 4 structure is anchored to the floor.

Figure 7:
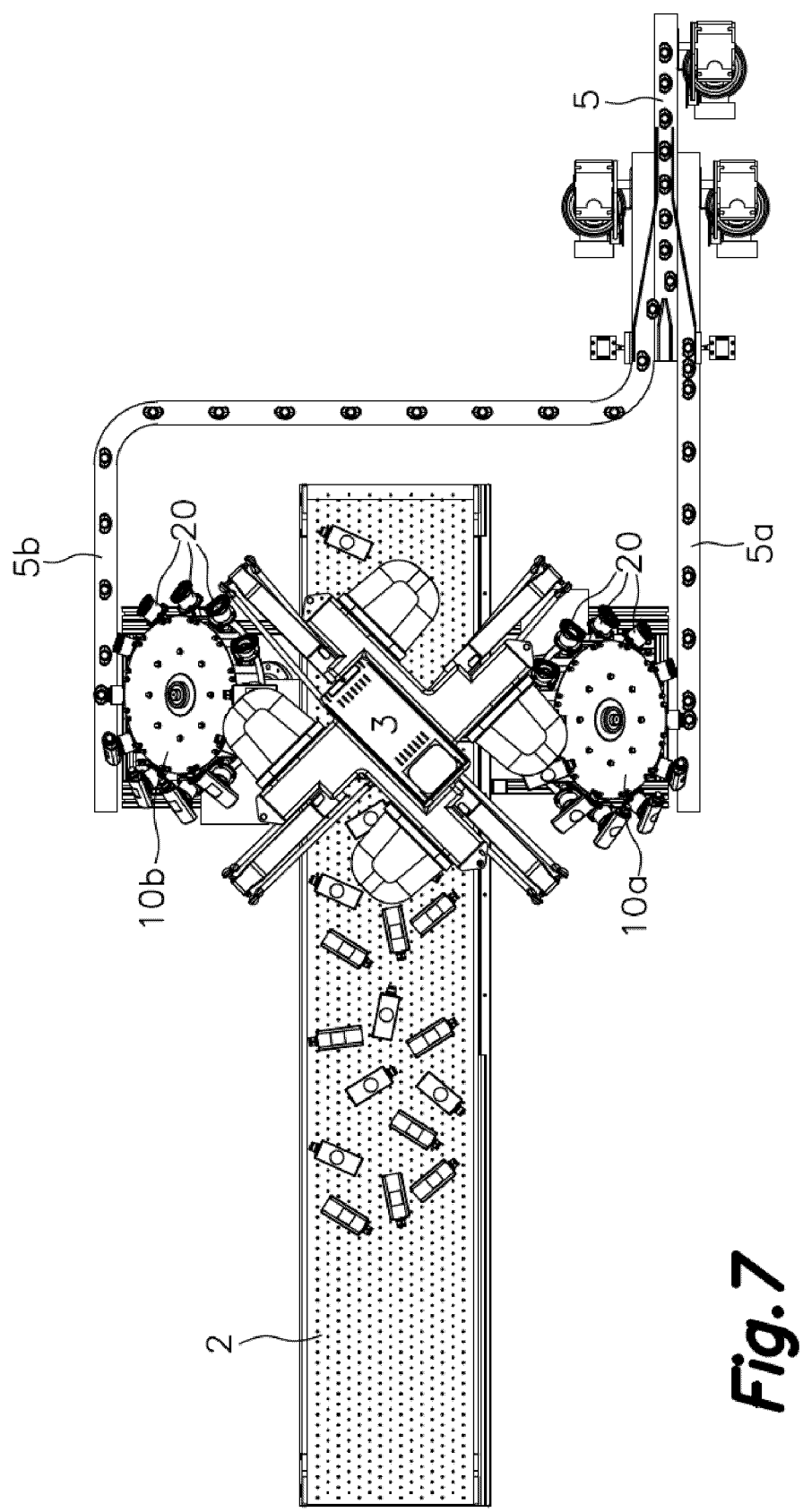
FIG. 7 is a top view of a machine for automatically positioning objects according to still another embodiment of the present invention, including two transfer conveyors located at opposed sides of the inlet conveyor.
Figure 8:
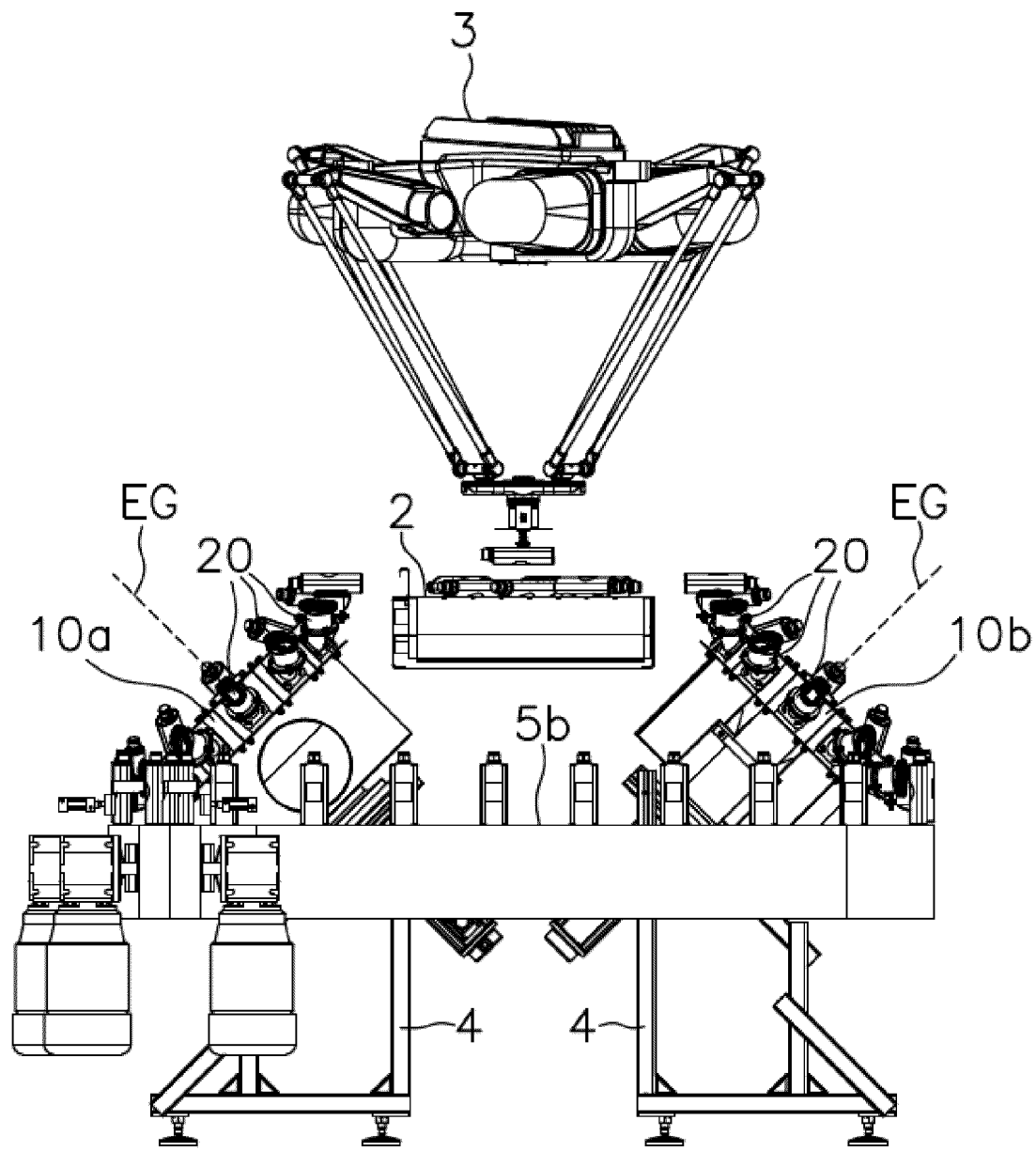
FIG. 8 is a lateral view of the machine for objects of FIG. 7.

FIGS. 7 and 8 show a machine 1 for automatically positioning bottles comprising two outlet conveyors 5a, 5b that are conveyor belts at each side of the inlet conveyor 2. FIG. 7 shows an upper view and FIG. 8 shows a front view of the machine 1. FIGS. 7 and 8 show one inlet conveyor 2 belt, one robotic collection device 3 that is an articulated arm robot with four axes that deliver bottles to the two rotary transfer members or two transfer conveyor 10a, 10b that are tilted or inclined. The two rotary transfer member or the two transfer conveyors 10a, 10b are located at different sides of the inlet conveyor 2. Each transfer conveyor 10a, 10b comprise a plurality of transfer fasteners 20 arranged in a closed loop. The two outlet conveyors 5a, 5b that are conveyor belts finally converge to a same conveyor belt 5, that means, each transfer conveyor 10a and 10b discharge The objects on different outlet conveyor 5a, 5b that join in a single outlet conveyor 5 with all the bottles having an uniform axial orientation. FIGS. 7 and 8 also show a support 4 structure for supporting the transfer conveyor 10 and the outlet conveyor 5 belt and this support 4 structure is anchored to the floor.

Figure 9:
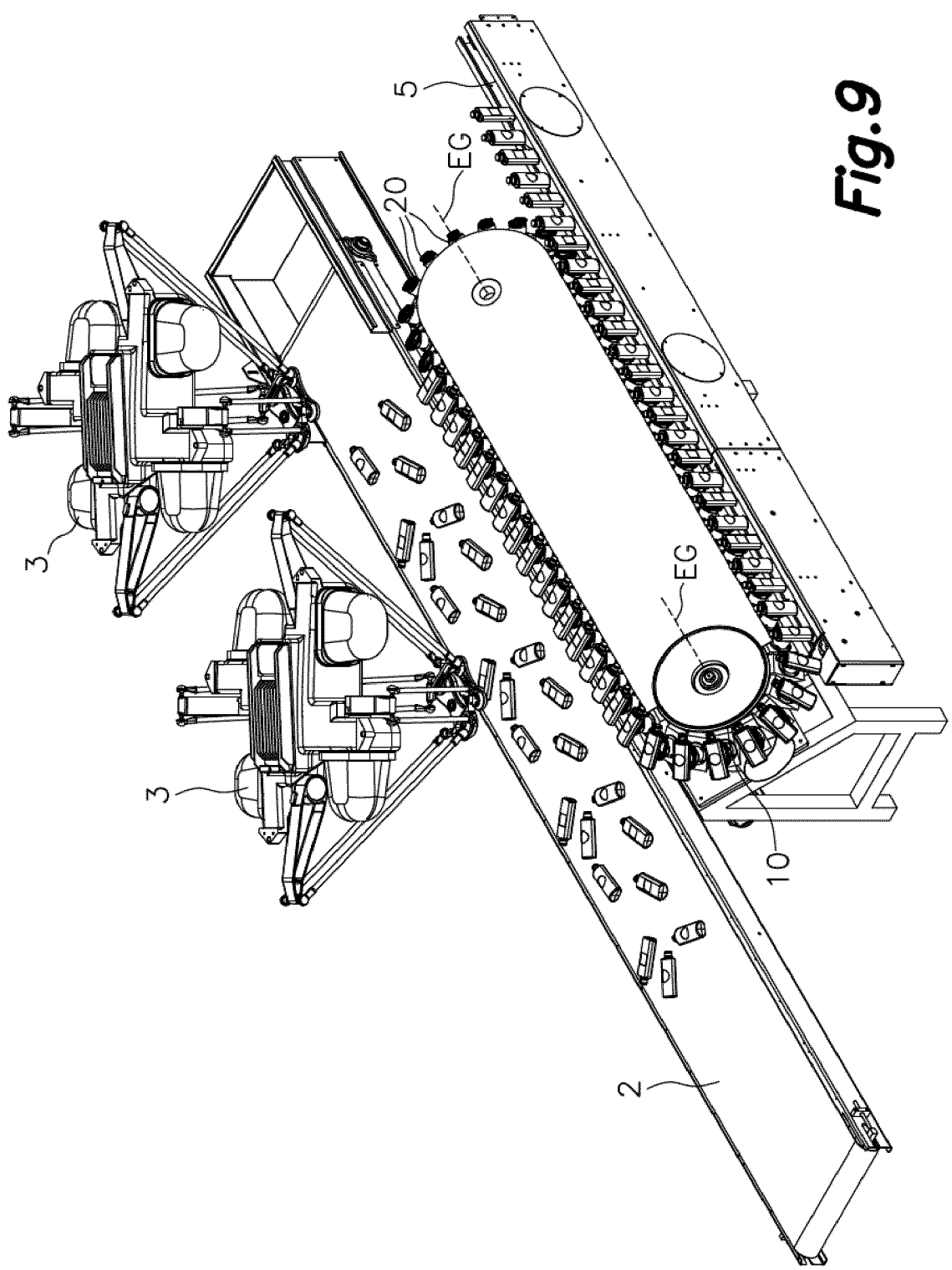
FIG. 9 is a perspective view of a machine for automatically positioning objects according to another embodiment of the present invention, wherein the transfer conveyor is a flexible band perpendicular to the tilted plane of the closed loop and parallel to the central axis, and wherein the upper receiving region and the lower delivery region are straight segments of the transfer conveyor.
Figure 10:
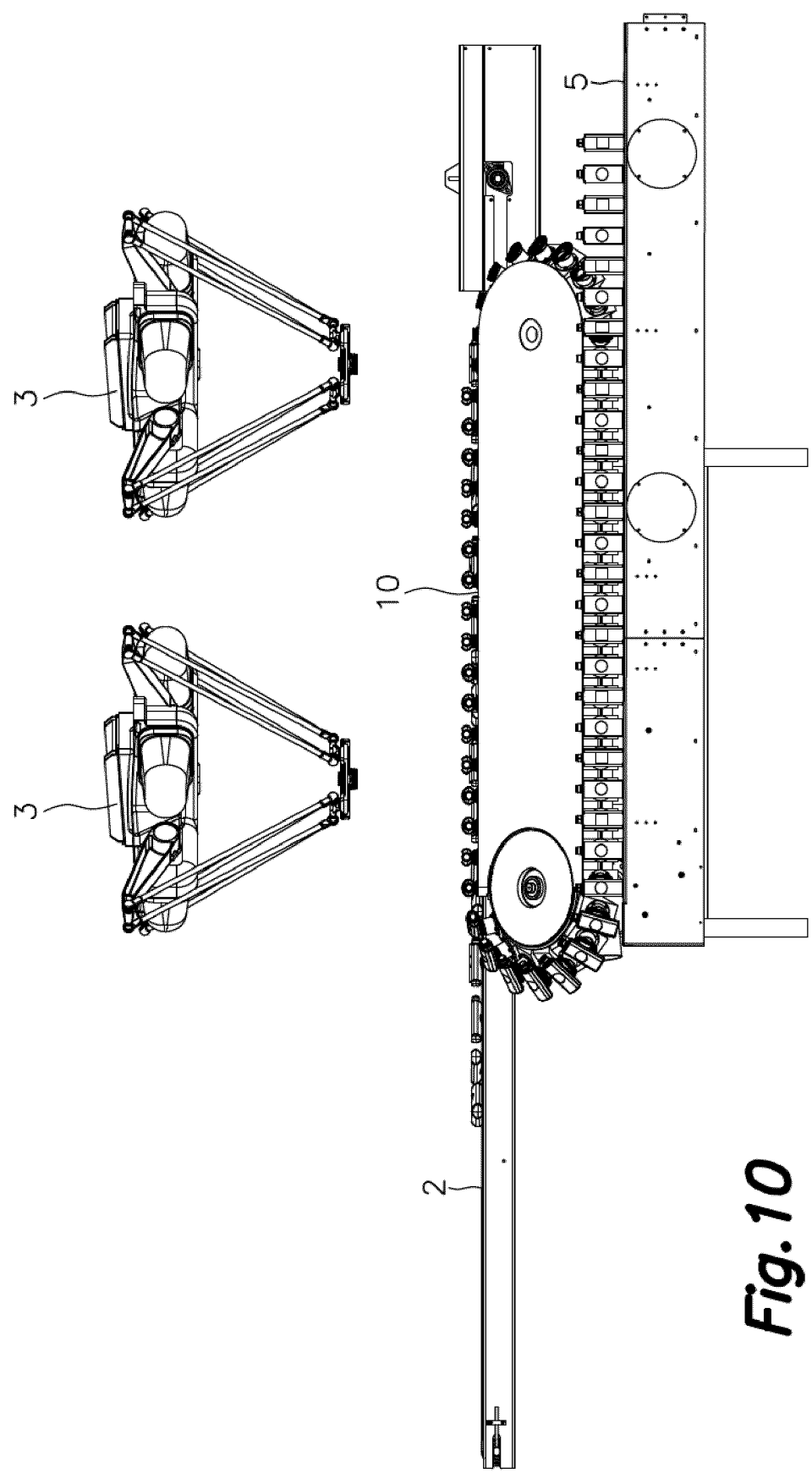
FIG. 10 is a lateral view of the machine for objects of FIG. 9.

FIGS. 9 and 10 shows an alternative embodiment of the machine 1 shown on FIG. 1, but in which the transfer conveyor 10 is a flexible band with two straight segments, one corresponding to the upper receiving region and the other corresponding to the lower delivery region, said straight segments being connected through two extreme semi-circular segments, the flexible band defining a closed loop in a tilted plane perpendicular to the central axis EG of both semi-circular segments of the flexible band. Said tilted plane is tilted 45 degrees regarding the horizontal, and the flexible band is perpendicular to said tilted plane.

The flexible band surrounds a static suction chamber 31 connected to a suction source 30, said flexible band being supported on a perimetral wall of the suction chamber 31.

The transfer fasteners 20 are attached to said flexible band, and the suction nozzles included on said transfer fasteners 20 are connected to the suction chamber 31 through said flexible band, which is perforated or includes openings aligned with perforations or openings of the perimetral wall of the suction chamber 31.

The perimetral wall of the suction chamber 31 includes regions without perforations or openings, said regions acting as static blocking screens which interrupts the connection between the suction nozzles of the transfer fasteners 20 and the suction chamber 31, releasing the objects retained in said suction nozzles. Said regions without perforations or openings are coincident with the lower delivery region, or at its end in the movement direction of the transfer fasteners 20.

Figure 11:
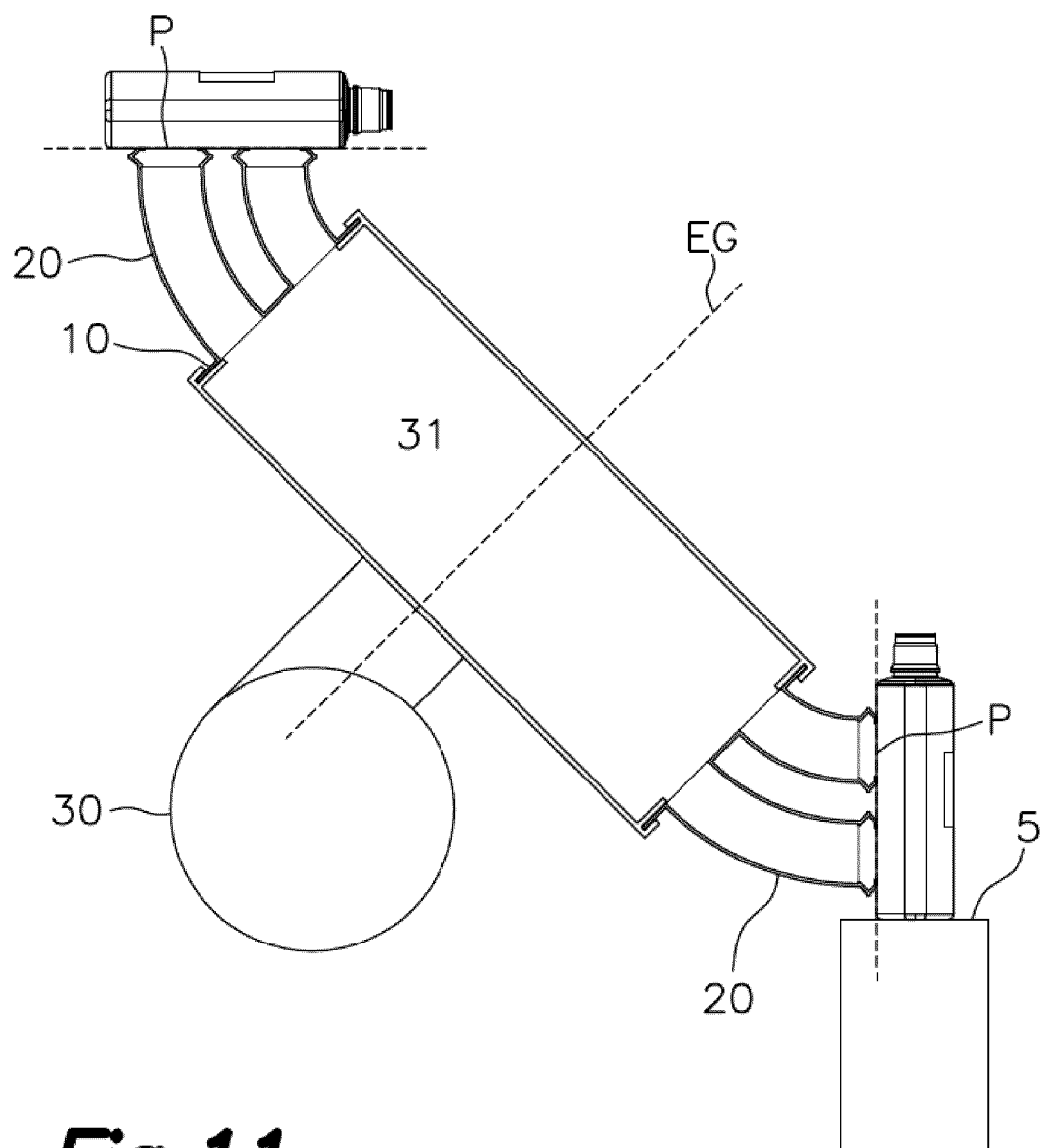
FIG. 11 is a section view of the transfer conveyor, including transfer fasteners in the upper receiving region and on the lower delivery region, according to an embodiment in which each transfer fastener includes two aligned suction nozzles defining the seat surface.

FIG. 11 shows a vertical cross-section of the suction chamber 31 of the embodiment shown on FIGS. 9 and 10, connected to the suction source 30, the perimeter wall of the suction chamber 31 being surrounded by the transfer conveyor 10, but including two suction nozzles on each transfer fastener 20.

The invention claimed is:

1. A machine for automatically positioning objects, comprising:
    at least one inlet conveyor configured to transport a plurality of objects in a lying position;
    a plurality of transfer fasteners, movable along a closed loop in a plane tilted with respect to horizontal plane, between an upper receiving region, where the transfer fasteners are movable in a first direction and configured to receive the objects held in a lying position, and a lower delivery region, where the transfer fasteners are movable in a second direction opposed to the first direction and configured to deliver the objects held in an upright position, transferring the objects from the lying position to the upright position due to the movement of the transfer fasteners along the closed loop;
    the transfer fasteners are attached in fixed positions along a periphery of a transfer conveyor movable along the closed loop, the transfer fasteners being dragged by the transfer conveyor;
    at least one outlet conveyor adjacent to the lower delivery region of the transfer conveyor and synchronized thereto for receiving the objects in the upright position;
    a detector system configured to identify at least an orientation and/or a shape of the objects transported on the inlet conveyor;
    at least one robotic collection device configured to collect the objects in the lying position from the inlet conveyor, to rotate along a vertical axis according to the information received from the detector system and to transfer the object to the upper receiving region of the transfer fasteners moving the object in the first direction in coordination with the movement of the transfer fasteners;
    each transfer fastener comprises a suction nozzle, connected to a suction source, each suction nozzle defining a seat surface tilted, with respect to the tilted plane of the closed loop, and the seat surface is approximately horizontal when in the upper receiving region and approximately vertical when in the lower delivery region; and
    the seat surfaces of all the transfer fasteners are non-recessed surfaces, exposed, configured to retain the objects by suction, without confinement of the objects in the transfer fasteners.

2. The machine according to claim 1 wherein the transfer conveyor is a flexible band perpendicular to the tilted plane of the closed loop.

3. The machine according to claim 2 wherein the flexible band is perforated and surrounds a suction chamber connected to the suction source, and the suction nozzles are connected to the suction chamber across the perforated flexible band.

4. The machine according to claim 1 wherein the upper receiving region, and the lower delivery region are straight segments of the transfer conveyor.

5. The machine according to claim 1 wherein the transfer conveyor is a disc shaped member rotative around an axis perpendicular to the tilted plane of the closed loop and the disc shaped member surrounds and/or contains a suction chamber connected to the suction source, the suction nozzles being connected to the suction chamber.

6. The machine according to claim 3 wherein the transfer conveyor comprises a static blocking screen configured to interrupt the connection between the suction nozzles of the transfer fasteners and the suction chamber coincident with the lower delivery region.

7. The machine according to claim 1, wherein the transfer conveyor is driven by a servomotor configured to stop or reduce the speed of the transfer conveyor when each transfer fastener is in the upper receiving position, the stop or reduced speed determining a corresponding lower delivery position of another transfer fasteners seat near the outlet conveyor.

8. The machine according to claim 1, wherein the tilted plane of the closed loop is tilted 45 degrees with respect to the horizontal.

9. The machine according to claim 1, wherein the outlet conveyor further comprises a plurality of pucks to receive objects lacking a base.

10. The machine according to claim 1, wherein the machine further comprises two transfer conveyors at different sides of the inlet conveyor.

11. The machine according to claim 1, wherein the machine further comprises two transfer conveyors at a same side of the inlet conveyor.

12. The machine according to claim 10 wherein the detector system is configured to differentiate between objects lying in a first lying position and objects in a second lying position, and the robotic collection device is configured to transfer the objects lying in the first lying position to one of the two transfer conveyors and to transfer the objects lying in the second lying position to the other of the two transfer conveyors.

13. The machine according to claim 10 wherein:
   each transfer conveyor discharges the objects on different outlet conveyors, the different outlet conveyors converge in a single outlet conveyor, where the bottles carried by the different outlet conveyors converge interleaved; or
   each transfer conveyor discharges the objects on different outlet conveyors, the different outlet conveyors converge in a single outlet conveyor where the bottles carried by the different outlet conveyors converge interleaved having all the objects a uniform axial orientation; or
   each transfer conveyor discharges the objects respectively on first and second successive portions of the same outlet conveyor, the objects discharged in the second portion being interleaved between the objects discharged on the first portion of the outlet conveyor; or
   each transfer conveyor discharges the objects respectively on first and second successive portions of the same outlet conveyor, the objects discharged in the second portion being interleaved between the objects discharged on the first portion of the outlet conveyor, all the objects being discharged with a uniform axial orientation.

14. The machine according to claim 10, wherein a turner transfer conveyor is a rotative conveyor, the rotative conveyor receives objects in the upright position from the lower delivery region of one of the first and second transfer conveyors and delivers the objects in the upright position to the outlet conveyor after turning the objects around a vertical object axis.

15. The machine according to claim 1 wherein each seat surface is an elongated seat surface, or a concave elongated seat surface, transverse to the movement direction of the transfer conveyor, the elongated seat surface or concave elongated seat surface being defined by one elongated suction nozzle or by a plurality of aligned suction nozzles.

16. The machine according to claim 5 wherein the transfer conveyor comprises a static blocking screen configured to interrupt the connection between the suction nozzles of the transfer fasteners and the suction chamber coincident with the lower delivery region.

17. The machine according to claim 11 wherein the detector system is configured to differentiate between objects lying in a first lying position and objects in a second lying position, and the robotic collection device is configured to transfer the objects lying in the first lying position to one of the two transfer conveyors and to transfer the objects lying in the second lying position to the other of the two transfer conveyors.

18. The machine according to claim 11 wherein:
   each transfer conveyor discharges the objects on different outlet conveyors, the different outlet conveyors converge in a single outlet conveyor, where the bottles carried by the different outlet conveyors converge interleaved; or
   each transfer conveyor discharges the objects on different outlet conveyors, the different outlet conveyors converge in a single outlet conveyor where the bottles carried by the different outlet conveyors converge interleaved having all the objects a uniform axial orientation; or
   each transfer conveyor discharges the objects respectively on first and second successive portions of the same outlet conveyor, the objects discharged in the second portion being interleaved between the objects discharged on the first portion of the outlet conveyor; or
   each transfer conveyor discharges the objects respectively on first and second successive portions of the same outlet conveyor, the objects discharged in the second portion being interleaved between the objects discharged on the first portion of the outlet conveyor, all the objects being discharged with a uniform axial orientation.

19. The machine according to claim 11 wherein a turner transfer conveyor is a rotative conveyor, the rotative conveyor receives objects in the upright position from the lower delivery region of one of the first and second transfer conveyors and delivers the objects in the upright position to the outlet conveyor after turning the objects around a vertical object axis.

* * * * *